(12) United States Patent
Viegas et al.

(10) Patent No.: US 8,864,465 B2
(45) Date of Patent: Oct. 21, 2014

(54) TEST BLADE

(75) Inventors: Joana Vaz Viegas, Derby (GB); Jeremy Nicholas Turner, Nottingham (GB)

(73) Assignee: Rolls-Royce PLC (GB)

( * ) Notice: Subject to any disclaimer, the term of this patent is extended or adjusted under 35 U.S.C. 154(b) by 1380 days.

(21) Appl. No.: 12/616,369

(22) Filed: Nov. 11, 2009

(65) Prior Publication Data

US 2010/0158693 A1    Jun. 24, 2010

(30) Foreign Application Priority Data

Dec. 23, 2008  (GB) .................................. 0823347.0

(51) Int. Cl.
| | | |
|---|---|---|
| F01D 5/14 | (2006.01) | |
| F01D 5/30 | (2006.01) | |
| F04D 29/32 | (2006.01) | |
| F01D 5/28 | (2006.01) | |
| G01M 15/14 | (2006.01) | |
| F01D 21/00 | (2006.01) | |
| F01D 21/04 | (2006.01) | |
| F04D 27/00 | (2006.01) | |
| F04D 29/02 | (2006.01) | |

(52) U.S. Cl.
CPC .............. *F01D 5/282* (2013.01); *F04D 29/324* (2013.01); *Y02T 50/672* (2013.01); *G01M 15/14* (2013.01); *F01D 5/3007* (2013.01); *F01D 21/003* (2013.01); *F01D 21/045* (2013.01); *F04D 27/001* (2013.01); *F04D 29/023* (2013.01)
USPC .............................. 416/2; 416/61; 416/231 B

(58) Field of Classification Search
USPC ............. 416/2, 61, 231 B, 231 R, 241 B, 248
See application file for complete search history.

(56) References Cited

U.S. PATENT DOCUMENTS

| | | | |
|---|---|---|---|
| 2,613,910 A | | 10/1952 | Stalker |
| 2,828,941 A | | 4/1958 | Foley |
| 2,978,796 A | * | 4/1961 | Kemeny ..................... 29/889.21 |
| 3,229,931 A | * | 1/1966 | Larsen ........................ 244/17.11 |
| 3,352,513 A | * | 11/1967 | Baker et al. ................ 244/17.15 |
| 3,912,200 A | * | 10/1975 | Foral .......................... 244/17.11 |

(Continued)

FOREIGN PATENT DOCUMENTS

| | | |
|---|---|---|
| CH | 316898 | 10/1956 |
| CH | 316898 A | 10/1956 |

(Continued)

OTHER PUBLICATIONS

European Search Report dated Apr. 23, 2013 from corresponding EP Application No. 09252561.

*Primary Examiner* — Edward Look
*Assistant Examiner* — Sean J Younger
(74) *Attorney, Agent, or Firm* — McCormick, Paulding & Huber LLP

(57) ABSTRACT

The present invention relates to a test blade for a blade-release test. The blade is arranged in use to be mounted on a hub for rotation, and to be released therefrom by the action of a controlled explosion. The blade is arranged to receive at least one explosive charge and at least one detonator for detonating the charge. The blade further comprises a cut-through portion extending completely through the blade from a front face to a rear face, the cut-through portion also extending part way along the blade in an axial direction between a leading edge and a trailing edge of the blade.

13 Claims, 5 Drawing Sheets

(56) References Cited

U.S. PATENT DOCUMENTS

| | | | |
|---|---|---|---|
| 3,926,388 A * | 12/1975 | Johnson et al. | 244/17.11 |
| 4,480,957 A * | 11/1984 | Patel et al. | 416/220 R |
| 5,308,228 A * | 5/1994 | Benoit et al. | 416/230 |
| 5,314,307 A | 5/1994 | Farmer | |
| 5,836,744 A * | 11/1998 | Zipps et al. | 416/193 A |
| 6,048,174 A * | 4/2000 | Samit et al. | 416/233 |
| 6,146,099 A | 11/2000 | Zipps et al. | |
| 6,187,411 B1 * | 2/2001 | Palmer | 428/102 |
| 6,431,837 B1 * | 8/2002 | Velicki | 416/223 R |
| 6,752,594 B2 | 6/2004 | Miller et al. | |
| 7,195,198 B2 * | 3/2007 | Boice et al. | 244/17.11 |
| 7,503,149 B2 * | 3/2009 | Salmon et al. | 52/661 |
| 7,656,517 B2 * | 2/2010 | McMillan | 356/237.1 |
| 8,251,640 B2 * | 8/2012 | Beckford et al. | 415/9 |
| 2004/0187691 A1 | 9/2004 | Lee | |
| 2006/0275132 A1 * | 12/2006 | McMillan | 416/224 |
| 2007/0269314 A1 | 11/2007 | Pearce | |
| 2009/0104030 A1 * | 4/2009 | McMillan | 415/200 |

FOREIGN PATENT DOCUMENTS

| | | |
|---|---|---|
| EP | 1433959 A1 | 6/2004 |
| JP | 2002201903 | 7/2002 |
| JP | 2002201903 A | 7/2002 |

* cited by examiner

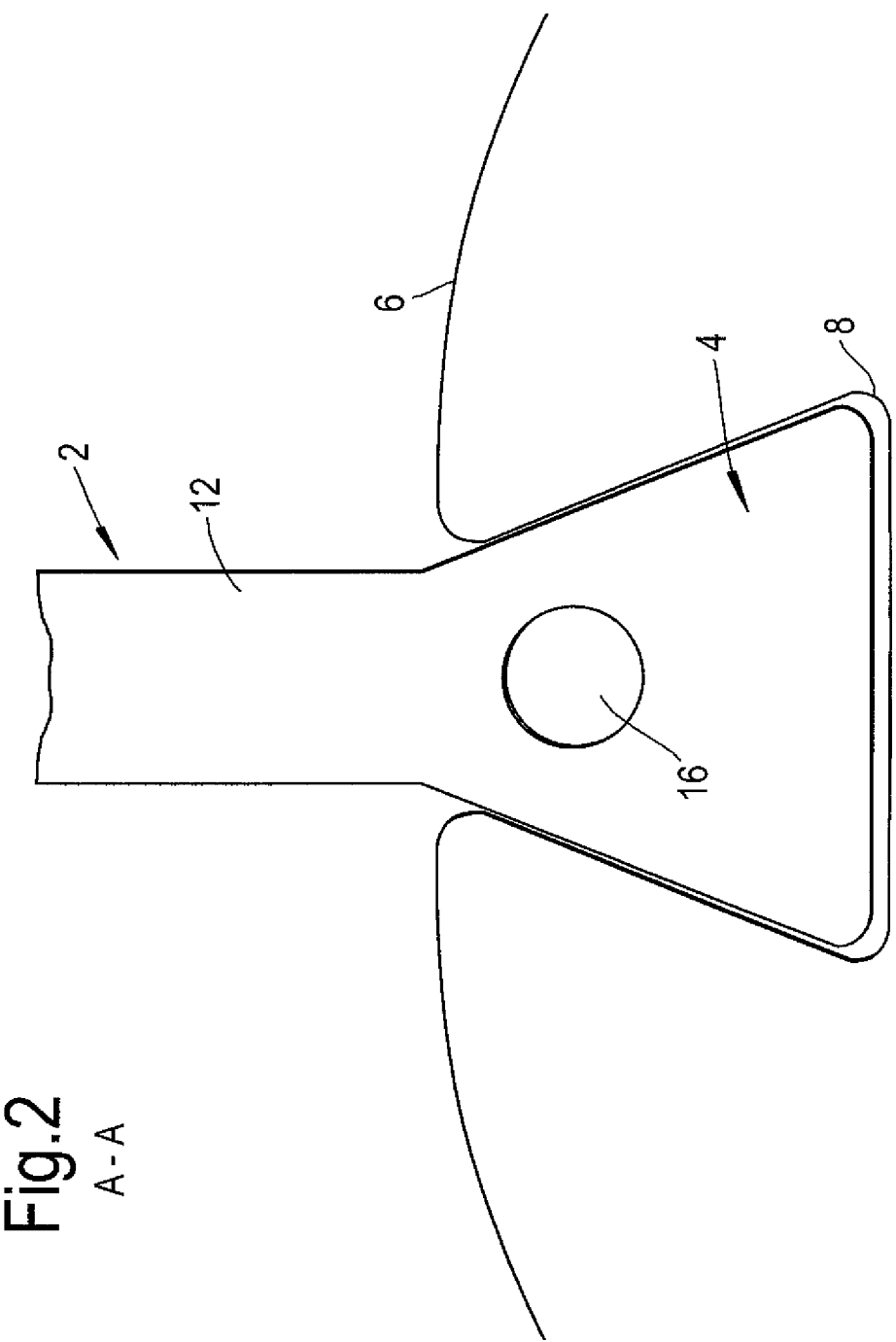

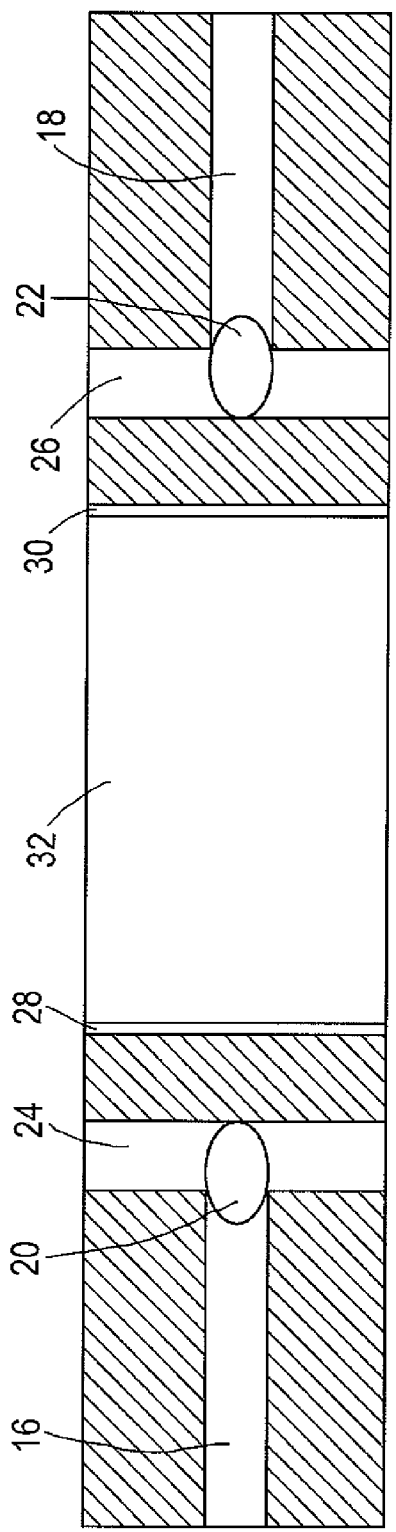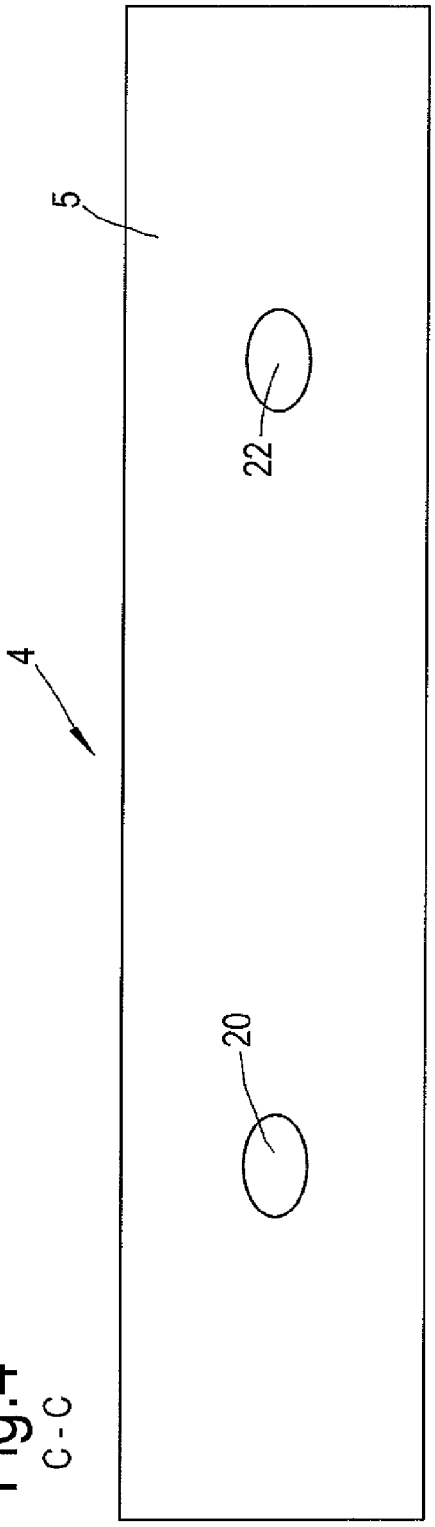

B-B

TEST BLADE

CROSS REFERENCE TO RELATED APPLICATION

This application is entitled to the benefit of British Patent Application No. GB 0823347.0, filed on Dec. 23, 2008.

FIELD OF THE INVENTION

The present invention relates to a test blade and to a method of preparing a test blade and is concerned particularly, but not exclusively, with an aerofoil/fan blade modified for an explosive release test, and to a method for preparing such a blade.

BACKGROUND OF THE INVENTION

A gas turbine jet engine includes a number of sets of blades that are mounted on rotational hubs. These include fan blades, turbine blades and compressor blades, all of which rotate at high speed. In use it is possible, although extremely unlikely, for a blade or part of a blade to become detached from the hub on which it is mounted whilst rotating. This results in the blade impacting its trailing blade and surrounding engine casing at high speed. Due to the mass and speed of the blade, the force at which impact occurs can be very high. It is therefore important that any damage caused by such an impact is not critical. Tests are therefore carried out to evaluate the damage which would be caused by the release of a blade during operation, in order to allow for appropriate design measures to be taken.

A known test method comprises detonating an explosive charge located within the blade, close to the root of the blade, thus causing the blade to be released from the hub. This is done by machining two holes along the root camber radius of the blade, the holes being positioned centrally about the blade root and radially located at the edge of the bedding (i.e. that portion of the hub which retains the root of the blade). An aluminium carrier containing an explosive charge is located in the centre of the hole and detonators are placed either side of the charge towards the leading and trailing edges of the blade. At a precisely pre-determined time, when the blade is rotating on the hub at maximum speed, the explosive charge is detonated. This causes the blade to become detached from the hub, and to impact its trailing blade and surrounding engine casing. The damage caused by the impact can then be evaluated.

Since the purpose of the test is to evaluate the damage caused by the blade, it is important that the explosive release of the blade does not significantly alter the blade's structural integrity so that a "worst-case" result can be achieved. For example, the blade should not be weakened to the extent where its performance is changed nor to the point that it is released prior to the determined time release. The timing of release must be controlled carefully to ensure that images of the event can be recorded.

When the above-described test is used with a metallic blade, when the explosive charge is detonated a crack propagates linearly through the shortest section of the blade which bears the critical failure load and the blade fails in tension under the centrifugal force. The blade is released almost instantaneously in a controlled manner and a dean failure surface is left at the blade root. The test can be used for both straight and curved rooted blades. However, it can be difficult to accurately machine a curved hole for the explosive charge and detonators that are required for a curved rooted blade.

By contrast, in a composite blade a number of layers of fibrous material are bonded together by resin. Radial fibres carry the centrifugal force whilst axial and diagonal fibres act to bind the structure together. A composite blade is much stronger in plane (axial/radial) than in the thickness (circumferential) direction. This is due to the relatively strong layers of fibrous material being bonded together by relatively weak resin.

Due to the structure of a composite blade a number of problems occur when the above-described method is used to release a composite blade. In particular, when the blade fails due to the explosion a linear crack does not propagate through the blade, as happens for a metallic blade. In order to ensure that a composite blade is cleanly detached from the hub almost instantaneously in a controlled manner, a shaped explosive charge must be used that causes enough of the radial fibres to fail under CF, releasing the blade aerofoil. However, when using explosives, the energy causes the surrounding resin to vaporise, overcoming the weak bonds between composite layers. This means that extensive delamination occurs throughout the blade and the structural integrity of the blade is significantly compromised, which may result in a test result that is less than the desirable "worst case".

In order to help prevent this delamination from occurring, the blade may be reinforced in the through-thickness direction using Kevlar stitching in a region above the explosive charge. However, the Kevlar stitching requires a number of small holes to be drilled through the blade which reduces the strength of the blade in the radial direction, and also reduces its resistance to twisting.

Embodiments of the present invention aim to address at least some of the above problems to some extent.

SUMMARY OF THE INVENTION

According to a first aspect of the present invention there is provided a test blade for a blade-release test, the blade having a root and being arranged in use to be mounted on a hub for rotation, and to be released there from by the action of a controlled explosion, the blade being arranged to receive at least one explosive charge and at least one detonator for detonating the charge, the blade further having a cut-through portion extending completely through the blade from a front face to a rear face, the cut-through portion also extending part way along the blade in an axial direction between a leading edge and a trailing edge of the blade. In a preferred arrangement the cut-through portion comprises an elongate slot.

The blade may include first and second cavities each for receiving an explosive charge, the cavities being located either side axially of the cut-through portion and extending respectively from leading and trailing edges of the root of the blade. The blade may have third and fourth cavities which extend from a hub-side root surface of the blade radially outwards respectively to the first and second cavities, the third and fourth cavities being arranged to receive detonators respectively for the explosive charges to be received in the first and second cavities. The blade may further include first and second inspection holes extending from a face of the blade to the respective locations inside the blade at which the first and second cavities meet the third and fourth cavities. The cavities are preferably disposed below an area where the blade emerges from the hub.

The blade may have reinforced portions either side axially of the cut-through portion.

The blade may have a composite blade.

According to a second aspect of the invention there is provided a method of preparing a blade for a blade release test in which a blade is mounted on a hub for rotation and at least a portion of the blade is released therefrom by the action of a controlled explosion, the method including the steps of providing the blade with a cut-through portion extending completely through the blade from a front face to rear face, the cut-through portion also extending part way along the blade in an axial direction between a leading edge and a trailing edge of the blade.

BRIEF DESCRIPTION OF THE DRAWINGS

FIG. 2 schematically shows the view A-A of FIG. 1;
FIG. 3 schematically shows the section B-B of FIG. 1;
FIG. 4 schematically shows the view C-C of FIG. 1.

DETAILED DESCRIPTION OF THE PREFERRED EMBODIMENTS

Figure 1:
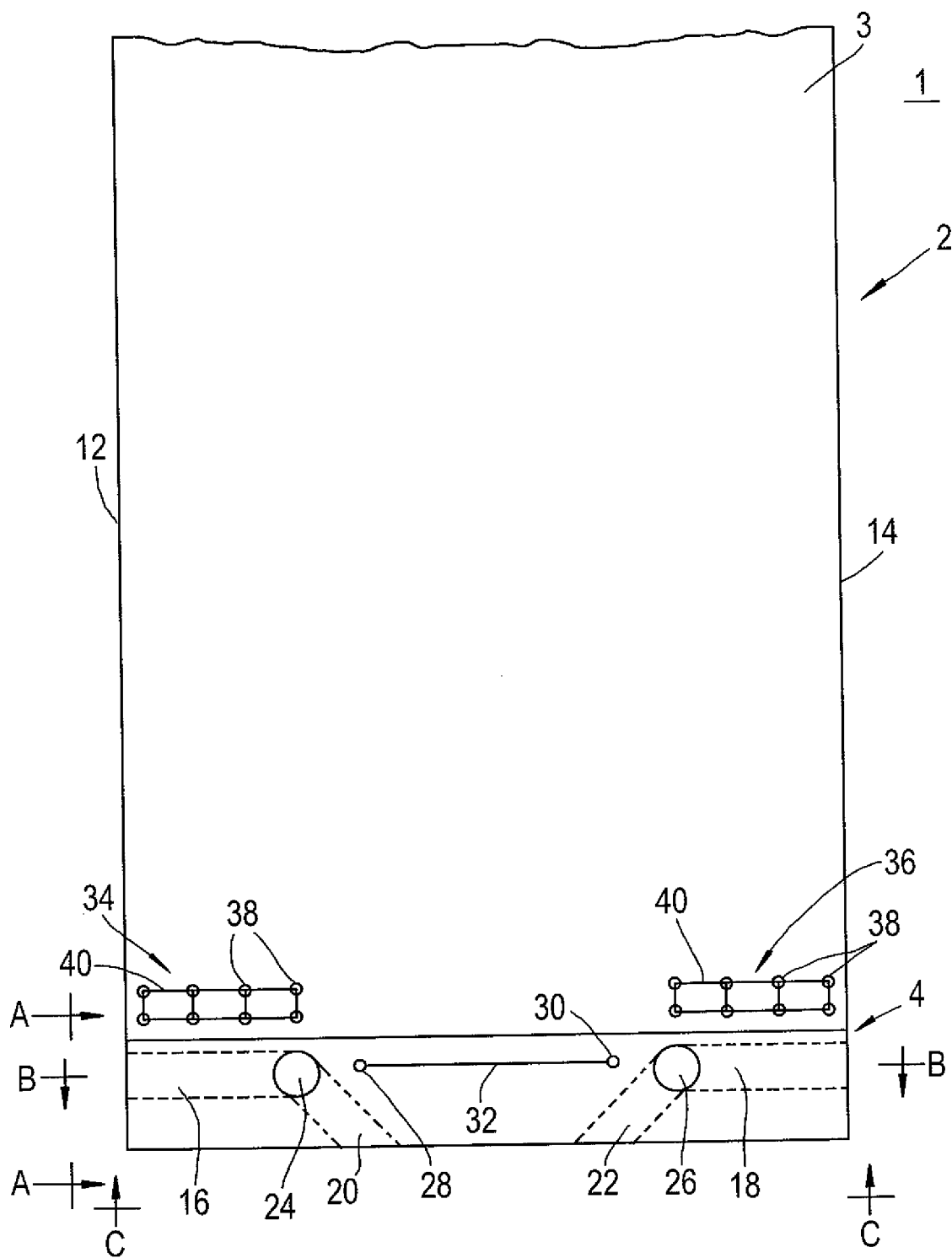
FIG. 1 schematically shows a test blade according to an embodiment of the invention.

FIG. 1 shows a straight-rooted composite blade 1, such as a fan blade, that is arranged such that it may be released from a hub (shown as 6 in FIG. 2) on which it is mounted during rotation using an explosive charge. The blade 1 comprises an aerofoil portion 2, having a leading edge 12 and a trailing edge 14, and a root 4. With reference to FIG. 2, in use the blade 1 is mounted to a hub 6 by fixing the blade root 4 in an axially extending slot 8 on the periphery of the hub 6. This portion of the hub is sometimes referred to as the bedding.

Referring to FIGS. 1 and 3, first and second cavities (hereinafter referred to as charge holes) 16, 18 are machined in the blade 1 from the leading edge 12 and trailing edge 14 respectively. The charge holes 16, 18 are straight and extend a preset distance into the blade 1. The charge holes 16, 18 are positioned below the edge of the bedding and are positioned centrally about the blade root 4.

Referring to FIGS. 1, 3 and 4, third and fourth cavities (hereinafter referred to as detonator holes) 20, 22 are machined in the blade 1 from the underside 5, or hub-side, of the blade root 4. The detonator holes 20, 22 are straight and extend into the blade 1 so as to meet the ends of the charge holes 16, 18. Each detonator hole 20, 22 is angled with respect to the underside 5 of the blade root 4. The detonator holes 20, 22 are positioned centrally about the blade root 4.

Referring to FIGS. 1 and 3, first and second inspection holes 24, 26 are machined in the blade 1 from the front face 3 of the blade. The inspection holes 24, 26 are straight and extend through the entire thickness of the blade 1. Each hole 24, 26 is positioned to meet the intersection point of a charge hole 16 and a detonator hole 20. The inspection holes 24, 26 are used to ensure that the charge holes 16, 18 and detonator holes 20, 22 have been machined correctly so that they meet.

Two pilot holes 28, 30 are machined in the blade 1 from the front face of the blade 1. The pilot holes extend through the entire thickness of the blade 1 and are located in the same plane as the charge holes 16, 18 and the inspection holes 24, 26. The pilot holes 28, 30 are located in between the two inspection holes 24, 26. The pilot holes 28, 30 provide stress relief to the slot 32 and allow the axial length of the slot to be accurately controlled.

The entire thickness of the blade 1 is then cut through in the axial direction between pilot holes 28, 30 providing a cut-through portion or slot, or interruption 32 in the radial direction of the blade (hereinafter referred to as a radial interruption). This means that the section of the blade 1 above the radial interruption 32 is incapable of bearing any centrifugal force and hence the strength of the blade 1 in the radial direction is reduced as compared with a blade without such a radial interruption. In other embodiments (not shown) the radial interruption may be an aperture, an opening, or a hole through the entire thickness of the blade, for example. In other embodiments it may be desirable to provide a weakened portion extending in the axial direction as opposed to a radial interruption. This may be in the form of one or more grooves or channels, for example.

Located above the charge holes 16, 18 on either side of the blade 1 are strengthened regions 34, 36. These are areas where the strength of the blade 1 in the through-thickness (circumferential) direction is increased. In this embodiment this is done by providing a plurality of stitching holes 38 through the entire thickness of the blade 1 and stitching with Kevlar 40.

When a standard blade 1 is mounted to a hub that is rotating there are complex stress fields located around the edge of the bedding. In the prior art, the hole for the explosive charge and detonators is located at the edge of the bedding in the region of concentrated stress. Since machining of the hole causes some of the radially extending fibres to be severed, thus reducing the radial strength of the blade, the blade is sometimes released prematurely before the explosion. In the embodiment described above, the charge holes 16, 18, detonator holes 20, 22, inspection holes 24, 26 and the radial interruption 32 may be located below the edge of the bedding and are therefore located away from the area of concentrated stress. This keeps the long, radially extending fibres of the blade in the region of the bedding intact, and hence helps to avoid premature release of the blade 1.

Figure 5:
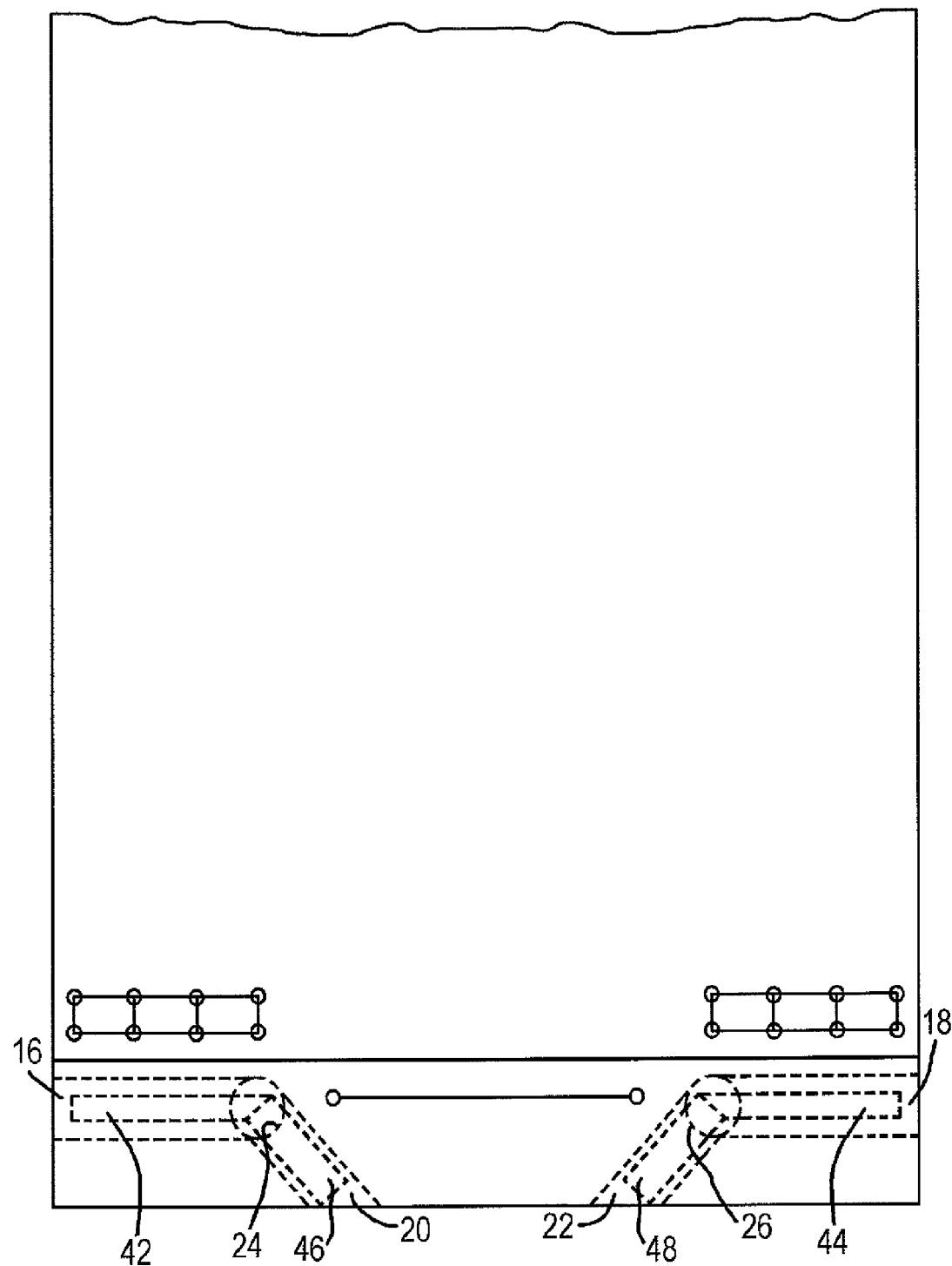
FIG. 5 schematically shows a test blade fitted with explosives and detonators according to an embodiment of the invention.

Referring to FIG. 5, when the blade 1 is to be used in a test process, explosive charges 42 and 44 housed in aluminium carriers, are placed within the charge holes 16, 18. Detonators 46, 48 are placed within the detonator holes 20, 22 so that they contact the explosive charges 42, 44. Correct alignment between the explosive charges 42, 44 and the detonators 46, 48 can be checked by inspection through the inspection holes 24, 26. When the explosive charges and detonators are satisfactorily in position, they may be secured using a small amount of adhesive to ensure they do not move during the engine assembly or test run-up processes. The ends of some or all of the holes 16, 18, 20, 22, 24, 26 may be left open or if desired capped off.

The blade 1 is then mounted onto the hub 6 by fixing the blade root portion 4 in the slot 8.

The hub 6 is then driven at maximum operating speed. The blade 1 is capable of carrying the centrifugal load generated by the rotation despite the reduced radial strength of the blade 1 caused by the axially extending radial interruption 32. When it is required to release the blade 1 from the hub 6, the detonators 46, 48 are activated in order to detonate the explosive charges 42, 44. This causes explosions which sever radially extending fibres in the region of the explosive charges 42, 44. The blade 1 is then released from the hub 6 almost instantaneously in a controlled manner. Due to the presence of the radial interruption 32 the explosive force required to cause the blade 1 to be released from the hub 6 is reduced, as compared with a blade having no such radial interruption. This is because it is not necessary for the explosive charge to sever all of the radially extending fibres across the entire axial width of the blade since a portion of them have been pre-severed by the radial interruption 32. Therefore it is not necessary to place explosive charges through the entire width (leading edge to trailing edge) of the blade 1 as was the case with the previously considered test blade. This ultimately reduces the mass of explosive charge required and hence reduces cost and the risk of blade aerofoil delamination.

Importantly, the extent of the blade which is exposed to the risk of delamination when the explosive charges 42, 44 are detonated is limited when compared with the prior art example described above. In particular, the radial interruption 32 effectively prevents delamination in a region above it because delamination forces cannot be transferred through the interruption 32. The blade thickness reinforcements 34, 36, in the form of the Kevlar stitching 40, reduce delamination in a region above them but they do not extend across the full axial width of the blade and, as a result the structural integrity of the blade 1 is largely maintained. This results in the blade 1 impacting the trailing blades and the engine casing with a more realistic "worst-case" impact.

The explosive charges 42, 44 may be shaped so as to direct the explosive force upwards towards the upper edge of the bedding. This helps to prevent the explosive charge from damaging the hub 6 when detonated. It also directs the explosive charge towards a position where the thickness of the blade is less. This means that a smaller cross sectional area of the blade 1 must be cut through by the explosive force in order to cause the blade to be released, allowing a smaller mass of explosive charge to be used.

In certain tests it may be desirable to release only a part of a blade 1 as opposed to the whole blade. The present invention is also suitable for such an application. The arrangement of the holes and radial interruption 32 are the same except that they are machined further up the blade away from the hub. A difference is that the detonator holes 20, 22 must be machined from the front face 3 of the blade 1 so as to meet the charge holes 16, 18.

As opposed to machining holes for the explosive charges 42, 44 and detonators 46, 48, it is possible to provide the explosive charges 42, 44 and detonators 46, 48 at the edge of the bedding on the outside of the blade 1. This allows the positions of the explosive charges 42, 44 and detonators 46, 48 to be adjusted with ease.

Instead of machining stitching holes 38 in the blade and stitching with Kevlar 40, other types of thickness reinforcement or stitching material may be used. Examples include, but are not limited to z—pinning, stapling and braiding.

Figure 6:
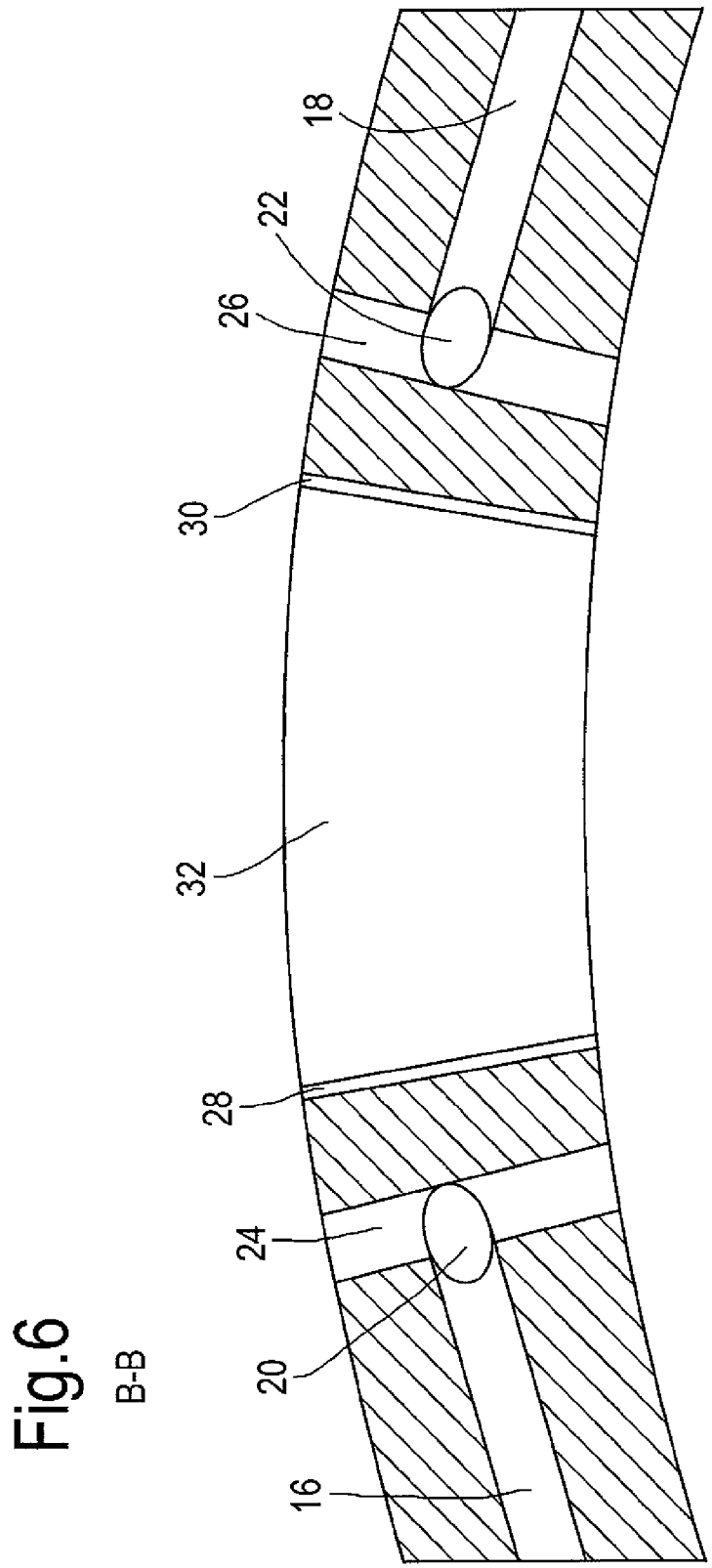
FIG. 6 schematically shows the view B-B of FIG. 1 for a curved rooted blade.

The foregoing embodiment has been described with reference to a straight rooted blade. However, the invention is equally applicable for a curved rooted blade since it is not necessary to provide a long curved hole for the explosive charge, as was the case with the prior art method. FIG. 6 shows the cross-sectional view B-B shown in FIG. 1 for a curved rooted blade 1. The arrangement is the same as for a straight rooted blade. The charge holes 16, 18 are machined into the blade from the leading edge 12 and the trailing edge 14 and are straight.

What is claimed is:

1. A resin and fibre composite test blade for a blade-release test, the blade comprising:
   a root arranged for mounting the blade in use to a rotating hub, and the blade arranged to be released therefrom by the action of a controlled explosion,
   the blade arranged to receive at least one explosive charge, and at least one detonator for detonating the charge, and
   a cut-through portion extending completely through the blade from a front face to a rear face, and part way along the blade in an axial direction between a leading edge and a trailing edge of the blade so as to provide a radial interruption of the fibres of the blade,
   wherein the blade comprises first and second cavities each for receiving an explosive charge, the cavities being located either side axially of the cut-through portion, and further comprises third and fourth cavities which extend from a lower surface of the blade radially outwards respectively to the first and second cavities, the third and fourth cavities being arranged to receive detonators respectively for the explosive charges to be received in the first and second cavities.

2. A resin and fibre composite test blade according to claim 1, wherein the cut-through portion further comprises an elongate slot.

3. A resin and fibre composite test blade according to claim 1, wherein the blade further comprises first and second inspection holes extending from a face of the blade to the respective locations at which the first and second cavities meet the third and fourth cavities.

4. A resin and fibre composite test blade according to claim 1, wherein the cavities are disposed below an area where the blade emerges from the hub.

5. A resin and fibre composite test blade according to claim 1, wherein the blade comprises reinforced portions either side axially of the cut-through portion.

6. A resin and fibre composite test blade according to claim 1, wherein the blade comprises at least one explosive charge.

7. A resin and fibre composite test blade according to claim 6, wherein the at least one explosive charge is located on the outside of the blade.

8. A method of preparing a resin and fibre composite blade for a blade release test in which a blade is mounted on a hub for rotation and at least a portion of the blade is released therefrom by the action of a controlled explosion, the method comprising the steps of:
   providing the blade with a cut-through portion extending completely through the blade from a front face to a rear face, and part way along the blade in an axial direction between a leading edge and a trailing edge of the blade so as to provide a radial interruption of the fibres of the blade;
   providing the blade with first and second cavities each for receiving an explosive charge, the cavities being located either side axially of the cut-through portion; and
   providing the blade with third and fourth cavities which extend from a lower surface of the blade radially outwards respectively to the first and second cavities, the third and fourth cavities being arranged to receive detonators respectively for the explosive charges to be received in the first and second cavities.

9. A method of preparing a resin and fibre composite blade according to claim 8, wherein the cut-through portion further comprises an elongate slot.

10. A method of preparing a resin and fibre composite blade according to claim 8, further comprising the steps of providing the blade with first and second inspection holes extending from a face of the blade to the respective locations at which the first and second cavities meet the third and fourth cavities.

11. A method of preparing a resin and fibre composite blade according to claim 8, further comprising the steps of providing the cavities below an area where the blade emerges from the hub.

12. A method of preparing a resin and fibre composite blade according to claim 8, comprising providing the blade with reinforced portions either side axially of the cut-through portion.

13. A method of preparing a resin and fibre blade according to claim 8, further comprising the step of positioning at least one explosive charge on and/or in the blade.

\* \* \* \* \*